(12) United States Patent
Sim et al.

(10) Patent No.: US 7,266,157 B2
(45) Date of Patent: Sep. 4, 2007

(54) SPACE-TIME TRANSMIT DIVERSITY (STTD) FOR MULTIPLE ANTENNAS IN RADIO COMMUNICATIONS

(75) Inventors: Dong-Hi Sim, Seoul (KR); Bong-Hoe Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 756 days.

(21) Appl. No.: 10/674,436

(22) Filed: Oct. 1, 2003

(65) Prior Publication Data

US 2004/0067739 A1    Apr. 8, 2004

(30) Foreign Application Priority Data

Oct. 2, 2002    (KR) .................. 10-2002-0060230

(51) Int. Cl.
*H04B 7/02*    (2006.01)
*H04L 1/02*    (2006.01)

(52) U.S. Cl. ..................................... 375/267
(58) Field of Classification Search ............... 375/267, 375/299, 347
See application file for complete search history.

(56) References Cited

U.S. PATENT DOCUMENTS

| 5,752,173 | A | 5/1998 | Tsujimoto | 455/137 |
| 6,873,606 | B2* | 3/2005 | Agrawal et al. | 370/310 |
| 7,047,016 | B2* | 5/2006 | Walton et al. | 455/452.1 |
| 2002/0196842 | A1* | 12/2002 | Onggosanusi et al. | 375/148 |
| 2004/0032910 | A1* | 2/2004 | Horng et al. | 375/267 |

FOREIGN PATENT DOCUMENTS

| JP | 2001-044900 | 2/2001 |
| KR | 10-2000-0055790 A | 9/2000 |
| KR | 10-2000-0050542 | 6/2002 |

* cited by examiner

*Primary Examiner*—Don N. Vo
(74) *Attorney, Agent, or Firm*—Ked & Associates, LLP

(57) ABSTRACT

A closed-loop STTD system extended from an open-loop STTD system adopting four antennas transmission diversity technique and its signal transmitting method are disclosed. The signal transmitting method in a closed-loop space-time transmit diversity (STTD) system having a plurality of transmission antennas, includes: space-time coding symbols to be transmitted; classifying the coded symbols to certain groups; and multiplying different weight values to each transmission symbol group and transmitting them.

21 Claims, 4 Drawing Sheets

SPACE-TIME TRANSMIT DIVERSITY (STTD) FOR MULTIPLE ANTENNAS IN RADIO COMMUNICATIONS

BACKGROUND OF THE INVENTION

1. Field of the Invention

The present invention relates to a mobile (radio or wireless) communication system and, more particularly, to a signal transmitting and receiving method in a closed-loop space-time transmit diversity (STTD) system having a plurality of transmission antennas.

2. Description of the Background Art

In general, in a mobile (radio or wireless) communication system, when data is transmitted at high speeds, the phase of a received signal is distorted due to a fading phenomenon (i.e., signal weakening) generated on a wireless channel. Fading reduces the amplitude of a received signal from a few decibels (dB) to scores of dB. Thus, if the distorted phase of the received signal is not compensated during data demodulation at the receiving end, information errors occur in the received data, and the quality of the overall mobile communication service is undesirably degraded.

Thus, in order to transmit data at high speeds without degradation of service quality, various types of signal transmission diversity techniques are employed,. An example is disclosed in, S. M. Alamouti, "A Simple Transmit Diversity Technique for Wireless Communications", IEEE Journal on Select Areas in Communications, Vol. 16, No. 8, pp. 1451-1458, October 1998. Also, additional background information can be found in 3GPP, "Physical Channels and Mapping of Transport Channels onto Physical Channels (FDD)", TS 25,211, V4.3.0, December 2001.

Transmission diversity techniques are generally classified into time diversity and space diversity. Time diversity, which uses interleaving and coding to overcome the fading, is commonly used for a Doppler spread channel. However, time diversity is not suitable for use in a low speed Doppler spread channel.

Space diversity is used for channels with a small delay spread (such as a so-called "indoor channel" used for indoor environments) and channels with a low speed Doppler spread (such as a so-called "pedestrian channel" used for pedestrians). Space diversity is a transmission diversity technique using two or more transmission/reception antennas. That is, upon transmitting the same signal through two transmission antennas, if the receiving end determines that the size of the signal transmitted through one antenna has been undesirably reduced due to fading (i.e., signal weakening), the signal transmitted through the other antenna is selected and received by the receiving end.

Space diversity is further classified into a reception antenna diversity (using multiple reception antennas), and a transmission antenna diversity (using multiple transmission antennas). For transmission antenna diversity, an algorithm used for receiving downlink signals and obtaining a diversity gain can be roughly divided into an open-loop mode and a closed-loop mode.

The third-generation partnership project (3GPP) currently employs a space-time transmit diversity (STTD) technique, which is a type of open-loop mode transmission antenna diversity. The STTD is a technique for obtaining a diversity gain through space-time coding, which is based upon the channel coding technique commonly applied on a time axis framework, but being extended into a spatial domain. Namely, the STTD is used to obtain a space diversity gain as well as a time diversity gain by performing coding among the symbols transmitted respectively through each antenna when two transmission antennas are used.

The STTD can be applied to every type of downlink physical channel, except a synchronization channel used in WCDMA. Open-loop STTD is advantageous in that it causes no detrimental changes in radio communication performance due to varying data transmission speeds, because a feedback signal is not necessary.

The general operation principles of the STTD technique for performing coding among the data symbols transmitted through two antennas will now be described.

The STTD encoding for two antennas and a transmission order based on time are shown in Table 1.

TABLE 1

|  | Time (t) | Time (t + T) |
|---|---|---|
| Antenna 1 | $s_1$ | $s_2$ |
| Antenna 2 | $-s_2^*$ | $s_1^*$ | wherein, 's' is a data symbol, and 'T' is a data symbol period.

Referring to Table 1, the symbols $(s_1, s_2)$ to be transmitted are encoded by an STTD encoder and then respectively sent to the two transmission antennas (antennas 1 and 2) in time consecutive order. That is, for antenna 1, symbol $s_1$ is sent at time t, and symbol $s_2$ is sent at a later time, t+T. For antenna 2, symbol $-s_2^*$ is sent at time t, and symbol $s_1^*$ is sent at a later time, t+T.

In other words, the STTD encoder outputs $s_1$ and $s_2$ to transmission antenna 1 as they are (i.e., without any further changes thereto after encoding), but the STTD encoder converts the symbols $s_1$ and $s_2$ into $-s_2^*$ and $s_1^*$, respectively, and then outputs them to antenna 2. Here, "*" indicates a conjugate. The symbols $(s_1, s_2, -s_2^*, s_1^*)$ sent to the transmission antennas are then transmitted to a receiving end via a multipath manner.

Assuming that the data symbols transmitted through each transmission antenna pass through respectively different independent channels, and assuming that there are no variations in the channel at time (t) and at time (t+T), the received signals $(r_1$ and $r_2)$ at the receiving end can be defined by equations (1):

$$r_1 = r(t) = h_1 s_1 - h_2 s_2^* + n_1$$

$$r_2 = t(t+T) = h_1 s_2 + h_2 s_1^* + n_2 \qquad (1)$$

wherein $h_1 (= \alpha_1 e^{j\beta_1})$ and $h_2 (= \alpha_2 e^{j\beta_2})$ represent the channels (e.g., are channel responses) between one transmission antenna (either antenna 1 or antenna 2) and the reception antenna, respectively, while $n_1$ and $n_2$ are noise factors referred to as an "additive white Gaussian noise" (AWGN), which is a complex Gaussian noise. Also $\beta_1$ and $\beta_2$ are phases of fading channels $h_1$ and $h_2$, respectively. Additionally $\alpha_1$ and $\alpha_2$ are amplitudes of fading channels $h_1$ and $h_2$, respectively Each channel ($h_1$ and $h_2$) can be estimated by using a pilot signal transmitted from each transmission antenna. Also, if the received signals ($r_1$ and $r_2$) are combined together in a manner shown in equations (2) below, the resulting output values (estimate (or deduced) symbols $(\hat{s}_1, \hat{s}_2)$) are equivalent to the output values obtained when using a maximum ratio combining (MRC) method of reception diversity, and thus the received symbols can be properly deduced (estimated).

$$\hat{s}_1 = h_1^* r_1 + h_2 r_2^* = (\alpha_1^2 + \alpha_2^2) s_1 + h_1^* n_1 + h_2 n_2^*$$

$$\hat{s}_2 = h_1^* r_2 - h_2 r_1^* = (\alpha_1^2 + \alpha_2^2) s_2 + h_1 n_2^* + h_2^* n_1 \qquad (2)$$

1) Related Art 4-Antenna Open-Loop STTD System

FIG. 1 is a drawing illustrating an open-loop STTD transmitting end using four antennas in the related art.

As shown in FIG. 1, the 4-antenna open-loop STTD transmitting end includes an STTD encoder 10 for performing space-time coding on data symbols to be transmitted; first multipliers 11 and 12 for multiplying certain gain factors ($\chi$ and $\xi$) to the data symbols outputted from the STTD encoder 10; second multipliers 13 and 14 for multiplying certain phase rotations ($\theta_1$ and $\theta_2$) to the outputs of the first multipliers 11 and 12; and four transmission antennas ($A_1$-$A_4$) for transmitting the outputs of each multiplier 11 through 14.

As shown in FIG. 1, upon receiving original data symbols to be transmitted, the STTD encoder 10 performs encoding and generates first data symbols ($s_1$, $s_2$, $s_3$ and $s_4$). The STTD encoder 10 then sends the first data symbols as they are (i.e., without any further changes thereto after encoding) for further processing and ultimately to the antennas $A_1$ and $A_2$.

On the other hand, the STTD encoder 10 performs encoding and processing to generate second data symbols ($-s_2^*$, $s_1^*$, $-s_4^*$ and $s_3^*$). Here, the processing includes converting the first data symbols ($s_1$, $s_2$, $s_3$ and $s_4$) into conjugate data symbols ($-s_2^*$, $s_1^*$, $-s_4^*$ and $s_3^*$), respectively. Thereafter, the second data symbols ($-s_2^*$, $s_1^*$, $-s_4^*$ and $s_3^*$) are output for further processing and ultimately sent to the antennas $A_3$ and $A_4$. Here, '*' signifies a conjugate.

The first data symbols ($s_1$, $s_2$, $s_3$ and $s_4$) outputted from the STTD encoder 10 are multiplied by a predetermined gain ($\chi$) in the multiplier 11, and delayed by a predetermined phase ($\theta_1$) in the multiplier 13. Meanwhile, the second data symbols ($-s_2^*$, $s_1$, $-s_4^*$ and $s_3^*$) outputted from the STTD encoder 10 are multiplied by a predetermined gain ($\xi$) in the multiplier 12, and then delayed by a predetermined phase ($\theta_2$) in the multiplier 14. Accordingly, the transmission antennas ($A_2$ and $A_4$) transmit the first data symbols with phase differences of $\theta_1$ and $\theta_2$, respectively, compared to the second data symbols transmitted by transmission antennas $A_1$ and $A_3$. Here, the gains ($\chi$ and $\xi$) are each assumed to be '1' merely to simplify calculations, Accordingly, signals containing data symbols transmitted through each transmission antenna ($A_1$~$A_4$) for each symbol duration (T) can be expressed by equation (3):

$$\begin{bmatrix} A_1 \\ A_2 \\ A_{3_1} \\ A_4 \end{bmatrix} = \begin{bmatrix} s_1 & s_2 & s_3 & s_4 \\ e^{j\theta_1}s_1 & e^{j\theta_1}s_2 & e^{j\theta_1}s_3 & e^{j\theta_1}s_4 \\ -s_2^* & s_1^* & -s_4^* & s_3^* \\ -e^{j\theta_2}s_2^* & e^{j\theta_2}s_1^* & -e^{j\theta_2}s_4^* & e^{j\theta_2}s_3^* \end{bmatrix} \quad (3)$$

The signal received during four symbol durations (4T) at the receiving end having one reception antenna can be expressed as equations (4):

$r_1 = (h_1 + h_2 e^{j\theta_1})s_1 - (h_3 + h_4 e^{j\theta_2})s_2^* + n_1$ $r_2 = (h_1 + h_2 e^{j\theta_1})s_2 + (h_3 + h_4 e^{j\theta_2})s_1^* + n_2$ $r_3 = (h_1 + h_2 e^{j\theta_1})s_3 - (h_3 + h_4 e^{j\theta_2})s_4^* + n_3$ $r_4 = (h_1 + h_2 e^{j\theta_1})s_4 + (h_3 + h_4 e^{j\theta_2})s_3^* + n_4$ \quad (4)

If $h_1 + h_2 e^{j\theta_1}$ and $h_3 + h_4 e^{j\theta_2}$ are substituted by 'a' and 'b', respectively, the signals received during the four symbol durations can be simplified to equations (5):

$r_1 = as_1 - bs_2^* + n_1$ $r_2 = as_2 + bs_1^* + n_2$ $r_3 = as_3 - bs_4^* + n_3$ $r_4 = as_4 + bs_3^* + n_4$ \quad (5)

Using equations (5), the original data symbols transmitted from the transmitting end can be deduced at the receiving end (i.e., can calculate an estimate of the original data symbols) by using equations (6):

$\hat{s}_1 = a^* r_1 + b r_2^* = (a^2 + b^2)s_1 + a^* n_1 + b n_2^*$ $\hat{s}_2 = a^* r_2 - b r_1^* = (a^2 + b^2)s_2 + a^* n_2 - b n_1^*$ $\hat{s}_3 = a^* r_3 + b r_4^* = (a^2 + b^2)s_3 + a^* n_3 + b n_4^*$ $\hat{s}_4 = a^* r_4 - b r_3^* = (a^2 + b^2)s_4 + a^* n_4 - b n_3^{'*}$ \quad (6)

The conventional 4-antenna open-loop STRD transmission method explained above shows an excellent performance when a terminal moves at a high speed, i.e., a fast-moving terminal (e.g., the user is in a moving vehicle), but the performance is degraded if the terminal moves at a low speed, i.e., a slow-moving terminal (e.g., the user is walking).

Here, the terms "high speed" and "low speed" are relative expressions, but may be defined as required by the radio communication environment. For example, a threshold speed for a moving terminal may be set to be 10 km/h (kilometers per hour). So, any movement at or over this threshold speed would be considered as "high," while any speed below the threshold would be considered as "low." That is, if the terminal is slow-moving, severe fading (i.e., signal weakening) may occur on the transmission path (e.g., a channel) of a specific transmission antenna used for the slow-moving terminal. Thus, If a transmission signal is lost due to severe fading at a specific antenna, transmission power must be undesirably further consumed to re-transmit the signal to the terminal.

Therefore, if the terminal moves at a low speed, a closed-loop STTD transmission method that employs feedback is preferably used to maximize the gain of the transmission antenna diversity. In other words, by using closed-loop STTD for slow-moving terminals, a better performance (e.g., signal connectivity) than that of the open-loop STTD transmission method can be obtained, because the closed-loop STTD transmission method uses the reception information of each antenna provided from the terminal (i.e., feedback is provided). Thus, by using both the open-loop and closed-loop STTD techniques, optimal performance (e.g., signal connectivity) can be obtained whether the terminal is fast moving or slow moving.

2) Related Art 2-antenna Closed-loop STTD System

FIG. 2 is a drawing illustrating a 2-antenna closed-loop STTD system using two transmission antennas in accordance with the related art. As shown in FIG. 2, the 2-antenna closed-loop STTD system includes a STTD transmitting end having two transmission antennas (Tx1, Tx2) and a STTD receiving end having one reception antenna (Rx).

The STTD transmitting end can include: an STTD encoder 20 for performing space-time coding on data symbols to be transmitted; multipliers 21 and 22 for multiplying predetermined weight values $w_1$ and $w_2$ to the data symbols outputted from the STTD encoder 20; and two transmission antennas Tx1 and Tx2 for respectively transmitting the outputs of the multipliers 21 and 22.

The STTD receiving end can include: one receiving antenna (Rx1); a STTD decoder 23 for performing space-time decoding on a signal received via the receiving antenna (Rx1); a cross-interference conversion unit 24 for processing output signals ($d_1$, $d_2$) of the STTD decoder 23 to generate estimate symbols ($\hat{s}_1$, $\hat{s}_2$); and a weight calculator 25 for calculating the weight values ($w_1$, $w_2$) and feeding back the information to the STTD sending end.

The signal transmission method in the related art 2-antenna closed-loop STTD system will now be described.

Upon receiving original data symbols to be transmitted, the STTD encoder 20 in the transmitting end performs encoding and generates first data symbols ($s_1$, $s_2$), which are sent for further processing and ultimately to the first antenna Tx1.

On the other hand, the STTD encoder 20 performs encoding and processing to generate second data symbols ($-s_2^*$, $s_1^*$). Here, the processing includes converting the first data symbols ($s_1, s_2$) into conjugate data symbols ($-s_2^*$, $s_1^*$), respectively. Thereafter, the second data symbols ($-s_2^*$, $s_1^*$) are sent for further processing and ultimately to the second antenna Tx2. Here, '*' signifies a conjugate.

The first data symbols ($s_1$, $s_2$) outputted from the STTD encoder 20 are multiplied by the weight value ($w_1$) in the multiplier 21 and then sent to the first antenna Tx1, while the second data symbols ($-s_2^*$, $s_1^*$) are multiplied by the weight value ($w_2$) in the multiplier 22 and then sent to the second antenna Tx2.

At the STTD receiving end having one reception antenna, the signals received during two symbol durations (2T) can be expressed as equations (7):

$$r_1 = w_1 h_1 s_1 - w_2 h_2 s_2^* + n_1$$

$$r_2 = w_1 h_1 s_2 + w_2 h_2 s_1^* + n_2 \quad (7)$$

wherein $h_1 (= \alpha e^{j\beta_1})$ and $h_2 (= \alpha_2 e^{j\beta_2})$ indicate the channels (i.e., channel responses) between the transmission antennas Tx1 and Tx2, and the reception antenna Rx, respectively, while $n_1$ and $n_2$ indicate an additive white Gaussian Noise (AWGN).

The STTD decoder 23 of the STTD receiving end performs space-time decoding on the received signals ($r_1$, $r_2$) received through the reception antenna Rx, and then generates and outputs decoded signals ($d_1, d_2$) expressed as equations (8):

$$d_1 = h_1^* r_1 + h_2 r_2^* = (w_1|h_1|^2 + w_2|h_2|^2)s_1 + (w_1 - w_2)h_1^* h_2 s_2^* + (h_1^* n_1 + h_2 n_2^*)$$

$$d_2 = h_1^* r_2 - h_2 r_1^* = (w_1|h_1|^2 + w_2|h_2|^2)s_2 + (w_2 - w_1)h_1^* h_2 s_1^* + h_1^* n_2 - h_2 n_1^*) \quad (8)$$

Assuming that $(w_1|h_1|^2 + w_2|h_2|^2) = A$, $(w_1 - w_2)h_1^* h_2 = B$, $(h_1^* n_1 + h_2 n_2^*) = C_1$ and $(h_1^* n_2 - h_2 n_1^*) = C_2$, the above equations (8) can be simplified to equations (9):

$$d_1 = AS_1 + BS_2^* + C_1$$

$$d_2 = AS_2 - BS_1^* + C_2 \quad (9)$$

The cross interference conversion unit 24 processes the decoded signals ($d_1, d_2$) outputted from the STTD decoder 23, and generates estimate symbols ($\hat{s}_1, \hat{s}_2$) that estimate (deduce) the original symbols transmitted by the transmitting end. That is, in order for the receiving end to estimate (deduce) the original symbols, the cross interference conversion unit 24 performs signal processing by using equations (10):

$$\hat{s}_1 = A^* d_1 - B d_2^* = (|A|^2 + |B|^2)s_1 + (A^* C_1 - BC_2^*)$$

$$\hat{s}_2 = A^* d_2 + B d_1^* = (|A|^2 + |B|^2)s_2 + (A^* C_2 + BC_1^*) \quad (10)$$

Meanwhile, the weight calculator 25 calculates the weight values ($w_1$, $w_2$) from the received signals ($r_1$, $r_2$) received via the reception antenna (Rx1), and feeds back the weight values ($w_1$, $w_2$) to the multipliers 21 and 22 of the STTD transmitting end. Here, the weight calculator 25 calculates a weight vector that maximizes the value A in the equation, $(w_1|h_1|^2 + w_2|h_2|^2) = A$. The reason for doing so is because, as shown in equations (10), the value A has the greatest influence in determining the "power of each symbol," that is, the transmission power required to transmit each data symbol. Namely, based upon the characteristics of $w_1^2 + w_2^2 = 1$ and $dA/dw_2 = 0$, the weight calculator 25 calculates each weight value ($w_1$, $w_2$) as shown in equations (11):

$$w_1 = \frac{|h_1|^2}{\sqrt{|h_1|^4 + |h_2|^4}}, \quad w_2 = \frac{|h_2|^2}{\sqrt{|h_1|^4 + |h_2|^4}} \quad (11)$$

Referring to the above, the present inventors have recognized a problem in the related art method. Namely, the weight values calculated by the weight calculator 25 have not been induced from an optimal weight vector that maximizes the estimated symbol transmission power. In other words, in order to maximize the transmission power of symbols ($\hat{s}_1, \hat{s}_2$) that are estimated (deduced) at the receiving end, a weight vector that maximizes $|A|^2 + |B|^2$ should be preferably calculated, in principle. However, because the related art weight calculation method generates weight values by inducing a weight vector that only maximizes A (and not $|A|^2 + |B|^2$), the related art has shortcomings in that the transmission power of the symbols ($\hat{s}_1, \hat{s}_2$) estimated at the receiving end cannot be maximized.

By employing transmission antenna diversity when two or more transmission antennas are used, not only is a diversity gain obtained by the multiple-antenna transmission unit, but also a signal-to-noise ratio gain is also obtained. Thus, the signal-to-noise ratio gain increases proportionally to the number of transmission antennas used.

As shown in FIG. 2, current UMTS systems generally employ transmission diversity techniques for two transmission antenna systems. However, this method is restricted to situations where there is an STTD receiving end that performs transmission diversity for two transmission antennas. Thus, the STTD receiving end operating under the current standards applicable to two transmission antenna systems would not operate properly if more than two transmission antennas are to be used.

In other words, the related art 2-antenna open-loop STTD system and method (e.g., FIG. 2) cannot be directly applied to closed-loop STTD systems employing more than two transmission antennas. For example, if four transmission antennas are to be used while still employing the related art method for transmitting signals with two antennas, the structures of the STTD transmitting end and the STTD receiving end of the closed-loop STTD system need to be changed, and the transmitting/receiving methods also need to be changed.

Similarly, the related art 4-antenna open-loop STTD technique (e.g., FIG. 1) cannot be applied to a 4-antenna closed-loop STTD technique, or at least there would be many difficulties in attempting to make such application.

Therefore, the present invention provides a structure and method for a closed-loop STTD being designed to be suitable for performing transmission antenna diversity when multiple (e.g., two or more) transmission antennas are employed.

The above references are incorporated by reference herein where appropriate for appropriate teachings of additional or alternative details, features and/or technical background.

SUMMARY OF THE INVENTION

Therefore, an object of the present invention is to provide a signal transmitting/receiving method in which an open-loop STTD for a four-antenna transmission diversity technique can be used as a closed-loop STTD for a multiple-antenna transmission diversity technique.

Another object of the present invention is to provide a signal transmitting/receiving method in which an STTD receiving end designed to be suitable for a closed-loop STTD system adopting a two-antenna transmission diversity technique, can be operated properly, even when a transmission diversity technique for two or more transmission antennas is used.

Still another object of the present invention is to provide a weight value calculating method capable of maximizing transmission power of a symbol estimated at the receiving end.

To achieve at least the above objects in whole or in part, there is provided a signal transmitting method in a closed-loop space-time transmit diversity (STTD) system having a plurality of transmission antennas, including: space-time coding symbols to be transmitted to classify them to certain groups; multiplying a weight value to each classified symbol group and transmitting them; multiplying a weight value to a received signal; and space-time decoding the multiplied signal to estimate a transmission data symbol.

Preferably, two or more transmission antennas are employed.

Preferably, each transmission symbol group includes a predetermined data symbol and a data symbol that is phase-shifted from the predetermined data symbol.

Preferably, the same weight value is multiplied to data symbols belonging to the same group.

Preferably, the weight value is an Eigen vector corresponding to a maximum Eigen value of a channel covariance matrix of channel vector.

Preferably, the weight value used in transmission and the weight value used in reception are the same.

The signal transmitting method further includes: Eigen-decomposing the chann 1 covariance matrix of channel vector estimated from the received signal to calculate a maximum Eigen value and an Eigen vector; selecting the calculated Eigen vector as a weight value; and feeding back the selected weight value to a transmitting end.

Preferably, each received signal group includes a received signal having a certain data symbol and a received signal having a complex value of the certain data symbol.

To achieve at least these advantages in whole or in part, there is further provided a signal transmitting method in a closed-loop space-time transmit diversity (STTD) system having a plurality of transmission antennas, including: space-time coding symbols to be transmitted; classifying the coded symbols into certain groups; and multiplying different weight values to each transmission symbol group and transmitting them.

Preferably, two or more transmission antennas are employed.

Preferably, each transmission symbol group includes a predetermined data symbol and a data symbol that is phase-shifted from the predetermined data symbol.

Preferably, the number of transmission symbol groups is determined on the basis of a total number of transmission antennas.

Preferably, the same weight value is multiplied to data symbols belonging to the same group.

Preferably, the weight value is an Eigen vector corresponding to a maximum Eigen value of a channel covariance matrix of channel vector.

To achieve at least thes advantages in whole or in part, there is further provided a signal receiving method in a closed-loop space-time transmit diversity (STTD) system having a plurality of transmission antennas, including: classifying received signals into certain groups; multiplying different weight values to each signal group; and space-time decoding the multiplied signals to estimate transmission symbols.

Preferably, the signal receiving method further includes: Eigen-decomposing a channel covariance matrix of channel vector estimated from a receiving signal and calculating a maximum Eigen value and an Eigen vector; selecting the obtained Eigen vector as a weight vector; and feeding back the selected weight value to a transmitting end.

Preferably, the weight value is the same as the weight value used in the transmitting end.

Preferably, a received signal including a certain symbol, and a received signal including a complex value of the certain symbol are classified into one group.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is implemented in a mobile (radio or wireless) communication system, such as a universal mobile telecommunications system (UMTS), which has been developed by the 3GPP. Nevertheless, the present invention can be also applied to communication systems operating under different standards. In addition, the present invention can also be applied to a mobile communication system using a plurality of transmission antennas and a plurality of reception antennas.

In particular, the present invention includes an STTD transmitting end and an STTD receiving end, and uses in a closed-loop STTD adopting the antenna transmission diversity technique. In this case, the STTD transmitting end may be a base station (or Node-B), and the STTD receiving end may be a terminal (or User Equipment (UE)).

In the present invention, if the closed-loop STTD is applied to four transmission antennas, the signals transmitted from the four transmission antennas for each symbol reception duration are classified into two groups.

Here, the grouping of the signals (having data symbols to be transmitted) can be performed by different components in the STTD transmitting end, as required. In particular, hardware and/or software that is/are part of the base station (Node-B) can be used to perform the required grouping procedure. For example, the STTD encoder at the transmitting end can include hardware and/or software to perform the grouping of the signals as desired.

Additionally, appropriate hardware and/or software is/are also provided in the receiving end (terminal). For example, the STTD decoder at the receiving end can include hardware and/or software to perform processing based upon the received grouped signals.

That is, the base station (Node-B) can include signal processing hardware and/or software to process and classify the input signals (having data symbols therein) into a first group comprising a first symbol(s) and a symbol(s) that is phase-shifted from the first symbol, and a second group comprising a second symbol(s) and a symbol(s) that is phase-shifted from the second symbol. Accordingly, even though four transmission antennas are used, two symbols are actually transmitted for one symbol interval. Therefore, an embodiment of the present invention proposes a system and method in which the data symbols from four transmission antennas are classified into two groups, and two weight values are multiplied to an STTD-coded signal.

In addition, the present invention provides a system and transmission method in which an STTD receiving end designed to be suitable for a closed-loop STTD system adopting the two-antenna transmission diversity technique, can be operated properly even if a multiple (two or more) antenna transmission diversity technique is used, such as a four-antenna transmission diversity technique explained further herebelow.

Embodiments of the present invention will now be described with reference to the accompanying drawings.

Figure 1:
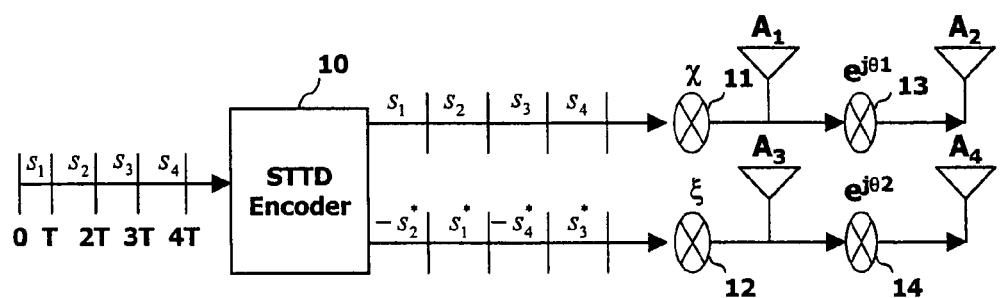
FIG. 1 illustrates a general open-loop STTD system adopting a four-antenna transmit diversity technique.
Figure 2:
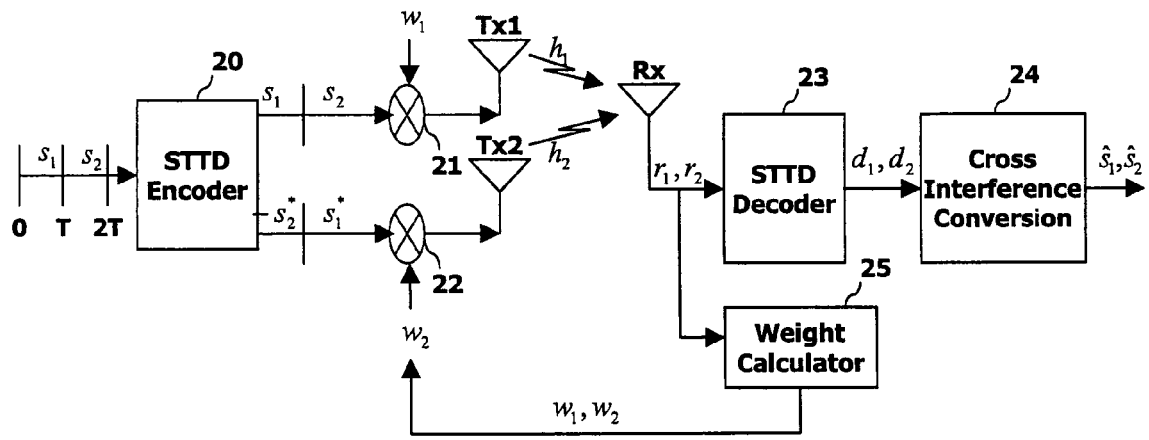
FIG. 2 illustrates a general closed-loop STTD system adopting a two-antenna transmit diversity technique.
Figure 3:
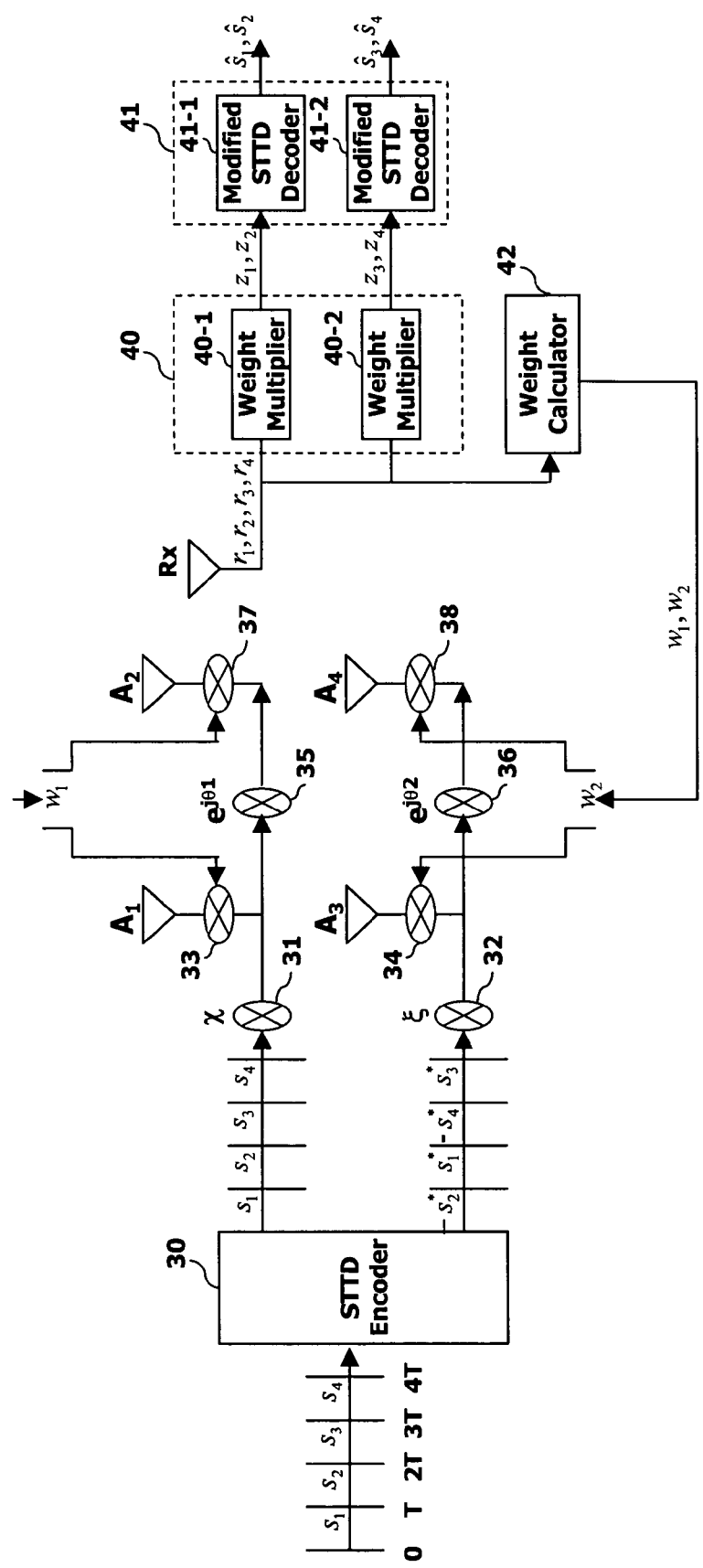
FIG. 3 illustrates a closed-loop STTD system adopting a four antenna transmit diversity technique in accordance with an embodiment of the present invention.

FIG. 3 illustrates a closed-loop STTD system adopting a four-antenna transmission diversity technique in accordance with an embodiment of the present invention. Here, it can be understood that a four-antenna transmission diversity technique is described merely for exemplary purposes, and that other multiple antenna transmission diversity techniques also fall within the scope of the present invention.

As shown in FIG. 3, the closed-loop STTD system includes an STTD transmitting end having four transmission antennas ($A_1$ through $A_4$) and an STTD receiving end having one reception antenna (Rx).

The STTD transmitting end can include: an STTD encoder 30 for space-time coding symbols to be transmitted; multipliers 31 and 32 for multiplying certain gains ($\chi$ and $\xi$) to the symbols outputted from the STTD encoder 30; multipliers 33 and 34 for multiplying weight values ($w_1, w_2$) fed back from the STTD receiving end to outputs of the multipliers 31 and 32; transmission antennas ($A_1, A_3$) for transmitting outputs of the multipliers 33 and 34; multipliers 35 and 36 for transiting outputs of the multipliers 31 and 32 as much as certain phases ($\theta_1, \theta_2$); multipliers 37 and 38 for multiplying the weight values ($w_1, w_2$) fed back from the STTD receiving end to outputs of the multipliers 31 and 32; and transmission antennas $A_2$ and $A_4$ for transmitting outputs of the multipliers 37 and 38.

The STTD receiving end can include: one reception antenna (Rx); a weight multiplier unit 40 for classifying signals received through the reception antenna Rx into two groups and multiplying the same weight value as that used in the STTD sending end; a transmission symbol estimator 41 for processing an output signal of the weight multiplier unit 40 to estimate a transmission symbol; and a weight calculator 42 for calculating a weight value from a receiving signal and feeding it back to the STTD sending end.

The weight multiplier unit 40 can include two weight multipliers 40-1 and 40-2, and the transmission symbol estimator 41 can include two modified STTD decoders 41-1 and 41-2.

Figure 4:
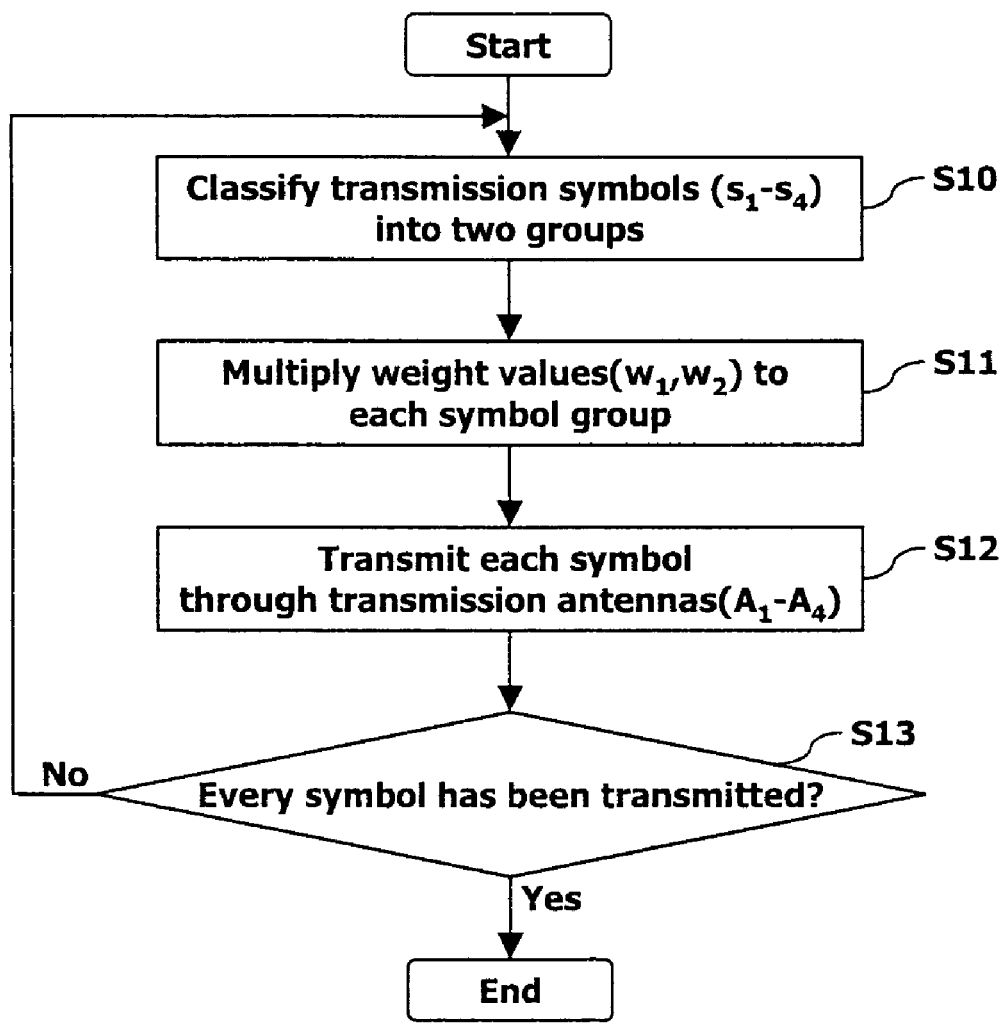
FIG. 4 is a flow chart of a signal transmitting method of a mobile communication system in accordance with an embodiment of the present invention.
Figure 5:
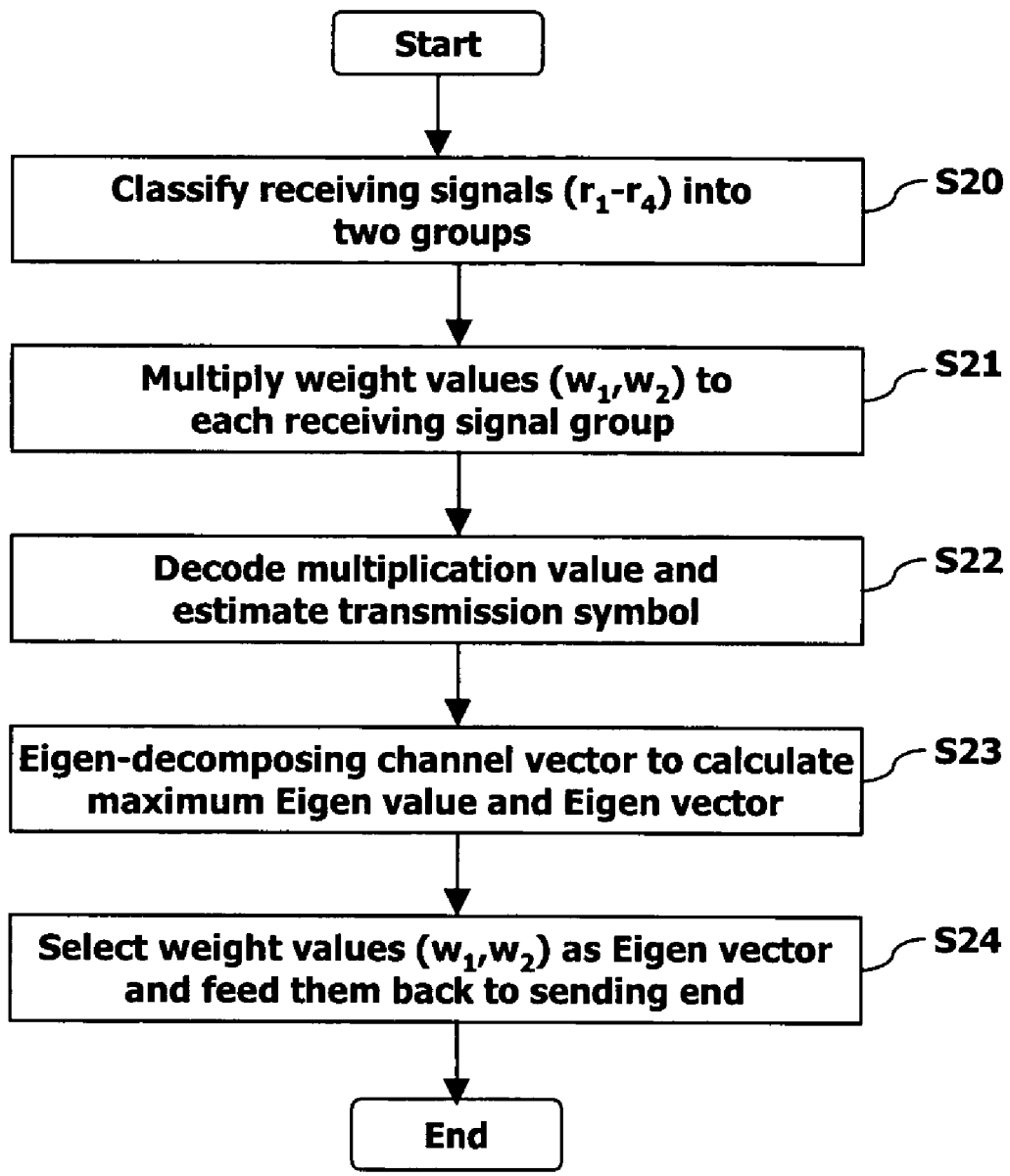
FIG. 5 is a flow chart of a signal receiving method of a mobile communication system in accordance with an embodiment of the present invention.

The operation of the closed-loop STTD system in accordance with the present invention will now be described with reference to FIGS. 3 to 5.

As shown in FIG. 3, when data symbols are inputted during a four-symbol duration (i.e., interval), the STTD encoder 30 performs encoding and outputs first data symbols ($s_1, s_2, s_3, s_4$) that are sent for processing and ultimately transmitted via the antennas $A_1$ and $A_2$. Meanwhile, the STTD encoder 30 performs encoding and converts the input symbols into conjugate values to generate second data symbols ($-s_2^*, s_1^*, -s_4^*, s_3^*$) that are sent for further processing and ultimately transmitted via the antennas $A_3$ and $A_4$. Herein '*' signifies a conjugate.

For the first data symbols ($s_1, s_2, s_3, s_4$) outputted from the STTD encoder 30, a first gain ($\chi$) is multiplied thereto by the multiplier 31 to obtain a resultant value, and then a first weight value ($w_1$) is multiplied to the resultant value by the multiplier 33. Thereafter, an output of the multiplier 31 is delayed by a phase ($\theta_1$) by the multiplier 35, to which the weight value ($w_1$) is multiplied by the multiplier 37.

For the second data symbols ($-s_2^*, s_1^*, -s_4^*, s_3^*$) outputted from the STTD encoder 30, a second gain $\xi$ is multiplied thereto by the multiplier 32 to obtain a resultant value, and then a second weight value ($w_2$) is multiplied to the resultant value by the multiplier 34. Thereafter, an output of the multiplier 32 is delayed as much as a phase ($\theta_2$) in the multiplier 36, to which the weight value ($w_2$) in the multiplier 38.

In the above, the gains $\chi$ and $\xi$ are assumed to equal '1' merely for convenience. Accordingly, the signals transmitted through each transmission antenna ($A_1 \sim A_4$) for each data symbol duration (T) can be expressed as equation (12):

$$\begin{bmatrix} A_1 \\ A_2 \\ A_3 \\ A_4 \end{bmatrix} = \begin{bmatrix} s_1 w_1 & s_2 w_1 & s_3 w_1 & s_4 w_1 \\ e^{j\theta_1} s_1 w_1 & e^{j\theta_1} s_2 w_1 & e^{j\theta_1} s_3 w_1 & e^{j\theta_1} s_4 w_1 \\ -s_2^* w_2 & s_1^* w_2 & -s_4^* w_2 & s_3^* w_2 \\ -e^{j\theta_2} s_2^* w_2 & e^{j\theta_2} s_1^* w_2 & -e^{j\theta_2} s_4^* w_2 & e^{j\theta_2} s_3^* w_2 \end{bmatrix} \quad (12)$$

Here, the signals transmitted through the four transmission antennas ($A_1$-$A_4$) for each data symbol duration (T) can be classified into two groups by appropriate hardware and/or software in the base station (Node-B). For example, a data symbol $s_1$ and a data symbol $e^{j\theta_1} s_1$ that is phase-shifted from the data symbol $s_1$ can be considered as one group, while a data symbol $s_2$ and a data symbol $e^{j\theta_2}s_2$ that is phase-shifted from the data symbol $s_2$ can be considered as another group.

That is, the data symbols to be transmitted through the transmission antennas $A_1$ and $A_2$ comprise one group, while the data symbols to be transmitted through the transmission antennas $A_3$ and $A_4$ comprise another group. This is because even though four transmission antennas are used, only two symbols are actually transmitted for one data symbol duration.

Accordingly, in the present invention, the data symbols to be transmitted through the four antennas are classified into two groups (step S10), and two weight values ($w_1$, $w_2$) are multiplied to the classified data symbol groups and transmitted through the transmission antennas ($A_1$-$A_4$) (steps S11-S12). This operation is repeatedly performed until every data symbol is transmitted (step S13).

In this case, the signals ($r_1$, $r_2$, $r_3$, $r_4$) received during a four symbol duration (4T) can be expressed as equations (13):

$$r_1 = w_1(h_1 + h_2 e^{j\theta_1})s_1 - w_2(h_3 + h_4 e^{j\theta_2})s_2^* + n_1$$

$$r_2 = w_1(h_1 + h_2 e^{j\theta_1})s_2 + w_2(h_3 + h_4 e^{j\theta_2})s_1^* + n_2$$

$$r_3 = w_1(h_1 + h_2 e^{j\theta_1})s_3 - w_2(h_3 + h_4 e^{j\theta_2})s_4^* + n_3$$

$$r_4 = w_1(h_1 + h_2 e^{j\theta_1})s_4 + w_2(h_3 + h_4 e^{j\theta_2})s_3^* + n_4 \qquad (13)$$

wherein $s_1$-$s_4$ are data symbols to be transmitted, $n_1$-$n_4$ are additive white Gaussian noise (AWGN), $h_1$-$h_4$ are channels (i.e., channel responses) between the transmission antennas (A1-A4) and the reception antenna Rx, respectively. Here, $\theta_1$ and $\theta_2$ are rotation phases that can be, for example, picked from a short look-up table.

In equations (13), when $h_1 + h_2 e^{j\theta_1}$ and $h_3 + h_4 e^{j\theta_2}$ are substituted with 'a' and 'b', respectively, the signals received during a four symbol duration can be expressed by equations (14):

$$r_1 = w_1 a s_1 - w_2 b s_2^* + n_1$$

$$r_2 = w_1 a s_2 + w_2 b s_1^* + n_2$$

$$r_3 = w_1 a s_3 - w_2 b s_4^* + n_3$$

$$r_4 = w_1 a s_4 + w_2 b s_3^* + n_4 \qquad (14)$$

Accordingly, the original data symbols ($s_1$, $s_2$) transmitted through the transmission antennas $A_1$ and $A_2$ can be properly estimated by grouping the received signals ($r_1$, $r_2$), while the original data symbols ($s_3$,$s_4$) transmitted through the transmission antennas $A_3$ and $A_4$ can be properly estimated by grouping the received signals ($r_3$, $r_4$) (step S20).

Once the received signals ($r_1$ through $r_4$) are inputted, the weight multiplier unit 40 of the STTD receiving end respectively multiplies the weight values ($w_1$, $w_2$) to the receiving signals classified into two groups by using the two weight multipliers 40-1 and 40-2, to thus generate signal ($z_1$, $z_2$) and signal ($z_3$, $z_4$) (step S21). Here, the signals ($z_1$, $z_2$) and signals ($z_3$, $z_4$) will be referred to as "intermediate signals" merely for convenience.

At the receiving end, unlike the related art STTD decoding in which the channels (e.g., $h_1$-$h_4$) are multiplied to the received signals ($r_1$-$r_4$), in the present invention, the weight values ($w_1$, $w_2$) are multiplied to the receiving signals ($r_1$-$r_4$).

In other words, the group signals are generated by using the same weight values ($w_1$, $w_2$) as those used in the STTD transmitting end, and the transmission symbols are finally estimated from the corresponding group signals. This is done because, experimentally, the present inventors have found that estimating (deducing) the transmission symbols after multiplying the weight values ($w_1$, $w_2$) can obtain better detection performance, The intermediate signals ($z_1$, $z_2$) outputted from the weight multiplier 40-1 of the weight multiplier unit 40 can be expressed as equations (15):

$$z_1 = w_1^* r_1 + w_2 r_2 = (a|w_1|^2 + b^*|w_2|^2)s_1 + (a^* - b)w_1^* w_2 s_2^* + (w_1 n_1 + w_2 n_2^*)$$

$$z_2 = w_1^* r_2 - w_2 r_1^* = (a|w_1|^2 + b^*|w_2|^2)s_2 + (b - a^*) w_1^* w_2 s_1^* + (w_1^* n_2 - w_2 n_1^*) \qquad (15)$$

By making substitutions such that $(a|w_1|^2 + b^*|w_2|^2) = X$, $(a^* - b)w_1^* w_2 = Y$, $(w_1^* n_1 + w_2 n_2^*) = M_1$ and $(w_1^* n_2 - w_2 n_1^*) = M_2$, the following equations (16) are obtained.

$$z_1 = X s_1 + Y s_2^* + M_1$$

$$z_2 = X s_2 - Y s_1^* + M_2 \qquad (16)$$

Thus, the modified STTD decoders 41-1 and 41-2 of the transmission symbol estimator 41 perform STTD decoding on the intermediate signals ($z_1$, $z_2$) and ($z_3$, $z_4$) outputted from the weight multiplier 40-1, and generate the symbols ($\hat{s}_1,\hat{s}_2$), ($\hat{s}_3,\hat{s}_4$) estimated in the STTD transmitting end (step S21). That is, the modified STTD decoder 31-1 applies equations (17) on the intermediate signals ($z_1,z_2$) outputted from the weight multiplier 30-1, to obtain an estimate of the symbols ($\hat{s}_1,\hat{s}_2$):

$$\hat{s}_1 = X^* z_1 - Y z_2^* = (|X|^2 + |Y|^2)s_1 + (X^* M_1 - Y M_2^*)$$

$$\hat{s}_2 = X^* z_2 + Y z_1^* = (|X|^2 + |Y|^2)s_2 + (X^* M_1 - Y M_2)^* \qquad (17)$$

In the above descriptions, only the intermediate signals ($z_1,z_2$) outputted from the weight multiplier 40-1 are mentioned, but the same procedures described is above are also applied to the intermediate signals ($z_3,z_4$) outputted from the weight multiplier 40-2.

Namely, the other received signal group (r3, r4) are processed by using the weight multiplier 40-2 and the modified STTD decoder 41-2, in order to obtain estimate symbols ($\hat{s}_3,\hat{s}_4$) for deducing the original data symbols transmitted from the STTD transmitting end.

Meanwhile, the weight calculator 42 receives the received signals ($r_1$-$r_4$) received through the reception antenna Rx, selects an Eigen vector corresponding to a maximum Eigen value of a channel matrix, and calculates the weight values ($w_1$, $w_2$) as shown in equations (18):

$$H = (\alpha, \beta)^T$$

$$R = HH^H$$

$$RW = \lambda W \qquad (18)$$

wherein the $H = (\alpha, \beta)^T$ indicates a channel covariance matrix of channel vector classified into two groups, whereby 'R' indicates an autocovariance matrix, '$\lambda$' is a maximum Eigen value of the autocovariance matrix, and 'W' indicates an Eigen vector corresponding to the maximum Eigen value.

That is, the weight calculator 42 estimates a channel vector ($\underline{H}$) grouped into two sets and performs an Eigen-decomposition on the estimated channel covariance matrix of channel vector ($\underline{H}$), thereby obtaining the maximum Eigen value ($\lambda$) and the Eigen vector (W) corresponding to the maximum Eigen value (step S22).

Accordingly, the weight calculator 42 selects the weight values (w1, w2) as the Eigen vector (W) corresponding to the maximum Eigen value (λ) of the channel vector and feeds them back to the STTD sending end (step S23).

In the above, it should be noted that a four-antenna closed-loop STTD system and method are described in detail only for exemplary purposes. It can be understood that the present invention is applicable to any closed-loop STTD employing an even number of transmission antennas. This is because one of two antennas within a group transmits the same signal but with a different phase. Consequently, only two weight values need be considered for two groups of signals.

As so far described, the signal transmitting and receiving method of the present invention has many advantages.

First, by extending the capabilities of the related art open-loop STTD system to be applicable to a four-antenna closed-loop STTD system, a gain of the closed-loop system as well as the gain of the STTD can be obtained, and thus, a radio (or wireless) communication quality can be enhanced.

Second, without changing the structures of the STTD transmitting and receiving ends, the related art closed-loop STTD system using two antennas can be implemented to a closed-loop STTD system using four antennas.

Third, by performing the Eigen-decomposition on a channel vector estimated in the STTD receiving end, an Eigen vector corresponding to a maximum Eigen value of the channel covariance matrix of channel vector is selected as a weight value and fed back to the STTD transmitting end. Thus, the transmission power of the symbol estimated at the receiving end can be maximized.

The foregoing embodiments and advantages are merely exemplary and are not to be construed as limiting the present invention. The present teachings can be readily applied to other types of apparatuses. The description of the present Invention is intended to be illustrative, and not to limit the scope of the claims. Many alternatives, modifications, and variations will be apparent to those skilled in the art. In the claims, any means-plus-function clauses therein are intended to cover the structure described herein as performing the recited function and not only structural equivalents but also equivalent structures.

What is claimed is:

1. A signal transmitting method in a closed-loop space-time transmit diversity (STTD) system having a plurality of transmission antennas, comprising:
   coding symbols to be transmitted to classify them into certain symbol groups;
   multiplying a weight value to each classified symbol group and transmitting each symbol group;
   multiplying a weight value to a received signal; and
   decoding the multiplied signal to estimate a transmission symbol, wherein each transmission symbol group includes a predetermined symbol and a symbol that is phase-shifted from the predetermined symbol.

2. The method of claim 1, wherein two or more transmission antennas are provided.

3. The method of claim 1, wherein the same weight values are multiplied to symbols belonging to the same group.

4. The method of claim 1, wherein the weight value in transmission and the weight value in reception are the same.

5. The method of claim 1, wherein the group of each received signal includes a received signal having a certain symbol and a received signal having a complex value of the certain symbol.

6. A signal transmitting method in a closed-loop space-time transmit diversity (STTD) system having a plurality of transmission antennas, comprising:
   coding symbols to be transmitted to classify them into certain symbol groups:
   multiplying a weight value to each classified symbol group and transmitting each symbol group;
   multiplying a weight value to a received signal; and
   decoding the multiplied signal to estimate a transmission symbol, wherein the weight value is an Eigen vector corresponding to a maximum Eigen value of a channel covariance matrix of channel vector.

7. A signal transmitting method in a closed-loop space-time transmit diversity (STTD) system having a plurality of transmission antennas, comprising:
   coding symbols to be transmitted to classify them into certain symbol groups;
   multiplying a weight value to each classified symbol group and transmitting each symbol group;
   multiplying a weight value to a received signal; and
   decoding the multiplied signal to estimate a transmission symbol, said method further comprising:
   Eigen-decomposing the channel covariance matrix of channel vector estimated from the receiving signal to calculate a maximum Eigen value and an Eigen vector;
   selecting the calculated Eigen vector as a weight value; and
   feeding back the selected weight value to a sending end.

8. A signal transmitting method in a closed-loop space-time transmit diversity (STTD) system having a plurality of transmission antennas, comprising:
   space-time coding symbols to be transmitted;
   classifying the coded symbols to certain symbol groups; and
   multiplying different weight values to each transmission symbol group and transmitting each symbol group, wherein each transmission symbol group includes a predetermined symbol and a symbol that is phase-shifted from the predetermined symbol.

9. The method of claim 8, wherein two or more transmission antennas are employed.

10. The method of claim 8, wherein the number of transmission symbol groups are based upon a total number of transmission antennas.

11. The method of claim 8, wherein the same weight value is multiplied to symbols belonging to the same group.

12. A signal transmitting method in a closed-loop space-time transmit diversity (STTD) system having a plurality of transmission antennas, comprising:
   space-time coding symbols to be transmitted
   classifying the coded symbols to certain symbol groups; and
   multiplying different weight values to each transmission symbol group and transmitting each symbol group, wherein the weight value is an Eigen vector corresponding to a maximum Eigen value of a channel covariance matrix of channel vector.

13. A signal receiving method in a closed-loop space-time transmit diversity (STTD) system having a plurality of transmission antennas, comprising:
   classifying receiving signals into certain signal groups;
   multiplying different weight values to each signal group; and
   space-time decoding the multiplied signals to estimate transmission symbols, wherein each transmission symbol group includes a predetermined symbol and a symbol that is phase-shifted from the predetermined symbol.

14. The method of claim 13, wherein the weight value is the same as the weight value used in the transmitting end.

15. The method of claim 13, wherein a received signal having the certain symbol and a received signal having a complex value of the certain symbol are classified as one signal group.

16. A signal receiving method in a closed-loop space-time transmit diversity (STTD) system having a plurality of transmission antennas, comprising:
classifying receiving signals into certain signal groups;
multiplying different weight values to each signal group; and
space-time decoding the multiplied signals to estimate transmission symbols, said method further comprising:
Eigen-decomposing a channel covariance matrix of channel vector estimated from a receiving signal and calculating a maximum Eigen value and an Eigen vector;
selecting the obtained Eigen vector as a weight vector; and
feeding back the selected weight value to a transmitting end.

17. A radio communication transmitting apparatus comprising:
a space-time transmit diversity (STTD) encoder to encode data symbols, and to generate first encoded symbols and second encoded symbols from the encoded data symbols;
a first multiplying unit to multiply a first weight value to the first encoded symbols from the STTD encoder to generate first weighted symbols, the first weight value being fed back from a receiving end; and
a second multiplying unit to multiply a second weight value to the second encoded symbols from the STTD encoder to generate second weighted symbols, the second weight value being fed back from the receiving end,
wherein the STTD encoder additionally classifies the data symbols into groups with the first and second encoded symbols being generated in accordance with the sorted groups, and wherein each symbol group includes a predetermined symbol and a symbol that is phase-shifted from the predetermined symbol.

18. The apparatus of claim 17, further comprising:
a first antenna unit having at least two transmission antennas to transmit the first weighted symbols received from the first multiplying unit; and
a second antenna unit having at least two transmission antennas to transmit the second weighted symbols received from the second multiplying unit.

19. A radio communication receiving apparatus comprising:
a receiving antenna to receive data symbols transmitted from a transmitting end;
a weight calculator to generate weight values for the received data symbols, and to feed back the weight values to the transmitting end;
a weight multiplying unit apply the weight values to each group of data symbols to generate intermediate values; and
a space-time transmit diversity (STTD) decoder to decode the intermediate values and to estimate the data symbols by using the intermediate values, wherein each group of data symbols includes a predetermined symbol and a symbol that is phase-shifted from the predetermined symbol.

20. The apparatus of claim 19, wherein the weight multiplying unit includes a plurality of weight multipliers.

21. The apparatus of claim 19, wherein a total number of weight multipliers equals a total number of data symbol groups.

* * * * *